United States Patent
Marois et al.

(10) Patent No.: US 8,349,470 B2
(45) Date of Patent: Jan. 8, 2013

(54) CLAD METAL SHEET AND HEAT EXCHANGER TUBING ETC. MADE THEREFROM

(75) Inventors: Pierre Henri Marois, Kingston (CA); Kevin Michael Gatenby, Kingston (CA); Thomas L. Davisson, Chardon, OH (US); Andrew D. Howells, Kingston (CA); Ian Smith, Kingston (CA)

(73) Assignee: Novelis Inc., Toronto, Ontario (CA)

( * ) Notice: Subject to any disclaimer, the term of this patent is extended or adjusted under 35 U.S.C. 154(b) by 420 days.

(21) Appl. No.: 12/653,894

(22) Filed: Dec. 17, 2009

(65) Prior Publication Data

US 2010/0159272 A1 Jun. 24, 2010

Related U.S. Application Data

(60) Provisional application No. 61/203,670, filed on Dec. 23, 2008.

(51) Int. Cl.
B32B 15/01 (2006.01)
(52) U.S. Cl. .......................... 428/654; 428/933; 165/905
(58) Field of Classification Search .................. None
See application file for complete search history.

(56) References Cited

U.S. PATENT DOCUMENTS

| | | | |
|---|---|---|---|
| 6,495,269 B1 | 12/2002 | Haszler et al. | |
| 7,255,932 B1 * | 8/2007 | Kilmer | 428/654 |
| 7,387,844 B2 | 6/2008 | Ueda et al. | |
| 7,472,740 B2 | 1/2009 | Anderson et al. | |
| 7,617,864 B2 | 11/2009 | Gallerneault | |
| 2007/0215313 A1 | 9/2007 | Wagstaff | |
| 2008/0008903 A1 | 1/2008 | Bull et al. | |

FOREIGN PATENT DOCUMENTS

| | | |
|---|---|---|
| CA | 2298257 A1 | 9/2000 |
| EP | 1 939 312 A1 | 7/2008 |
| GB | 1182821 A | 3/1970 |
| JP | 60/230953 A | 11/1985 |
| JP | 60/251246 A | 12/1985 |
| SU | 912550 A1 | 3/1982 |
| WO | WO 2007/042206 A1 | 4/2007 |

OTHER PUBLICATIONS

Vargel, Christian, et al.; Corrosion of Aluminum; Elsevier Ltd.; pp. 95-96; 2004.*

(Continued)

*Primary Examiner* — Jennifer McNeil
*Assistant Examiner* — Daniel J Schleis
(74) *Attorney, Agent, or Firm* — Cooper & Dunham LLP

(57) ABSTRACT

The exemplary embodiments relate to a multilayer aluminum alloy sheet material suitable for fabrication into coolant-conveying tubes, headers and the like used for heat exchangers, and to the tubes and headers, etc., fabricated from the sheet. The multi-layer metal sheet has a core layer of aluminum alloy having first and second sides. The first side has an interlayer made of a Zn-containing aluminum alloy positioned between a Zn-containing outer layer and the core layer. The alloy of the outer layer is more electronegative than the alloy of the interlayer. The alloy of the interlayer is preferably more electronegative than the alloy of the core layer. The first side clad in this way is the side intended for exposure to the coolant, and provides good resistance to corrosion and erosion.

13 Claims, 3 Drawing Sheets

OTHER PUBLICATIONS

U.S. Appl. No. 12/587,368, Oct. 5, 2009, Gallerneault.
U.S. Appl. No. 12/590,566, Nov. 10, 2009, Gupta et al.
U.S. Appl. No. 12/653,930, Dec. 17, 2009, Geho et al.
U.S. Appl. No. 12/653,934, Dec. 17, 2009, Kang et al.
U.S. Appl. No. 12/657,876, Jan. 28, 2010, Brown et al.
Patent Abstracts of Japan, 60-251246, "Water Resistant Brazing Sheet For Vacuum Brazing and Heat Exchanger Using Said Material", Dec. 11, 1985, C22C 21/12, Umibe et al.
Patent Abstracts of Japan, 60-230953, "Composite Plate Made of Aluminum Material for Heat Exchanger", Nov. 16, 1985, C22C 21/10, Fujiyoshi et al.
EPODOC, SU912550, "Three-Ply Corrosion-Resistant Steel", Mar. 15, 1982, B32B 15/01, Ovsyannikov et al.
Canadian Intellectual Property Office, International Search Report, Jan. 2, 2010, PCT/CA2009/001835 (Novelis Inc., et al.).

* cited by examiner

CLAD METAL SHEET AND HEAT EXCHANGER TUBING ETC. MADE THEREFROM

CROSS-REFERENCE TO RELATED APPLICATION

This application claims the priority right of U.S. provisional patent application Ser. No. 61/203,670 filed Dec. 23, 2008 by applicants named herein. The entire disclosure of application Ser. No. 61/203,670 is incorporated herein by this reference.

BACKGROUND OF THE INVENTION (1) Field of the Invention

This invention relates to clad metal sheet intended for the manufacture of tubing and headers used for conveying water, e.g. as used in heat exchangers such as automobile radiators. More particularly, the invention relates to such clad metal sheet structures and the tubing or headers made therefrom.

(2) Description of the Related Art

Water-conveying metal tubing used in heat exchangers is often subject to internal corrosion from the cooling water, especially when such water contains various chemicals, such as those used to elevate the boiling point or to depress the freezing point of the coolant, etc. The metal used for such tubing is frequently an aluminum alloy, and alloys of the AA3000 series (containing Mn) are often chosen for their formability, heat conduction and relatively low cost. It is conventional to provide one surface of a sheet of such alloy with a coating of a so-called brazing alloy, i.e. an aluminum alloy having a low melting temperature. This is often an alloy of the AA4000 series containing large amounts of Si. The surface of the metal sheet coated in this way is the surface intended as outer surface of a tube made of the metal sheet. This allows the tubing, once formed, to be connected by brazing to metal fins intended to provide enhanced heat exchange with air. Such cladding is often referred to as "air-side cladding" for obvious reasons.

The surface intended to be the internal surface of the tube is sometimes coated or clad with a metal intended to reduce or delay corrosion. The internal fluid in a heat exchanger (e.g. radiator) would normally and ideally contain 50% de-ionised or de-mineralised water, with about 50% inhibited coolant added. However, despite such benign coolants, corrosion still occurs, especially if incorrect filling practices are carried out. An internal cladding of the core of this kind is often referred to as a "water-side cladding." At the moment, alloys such as AA7072 and AA3003 (with an addition of 1.5 wt % Zn) are commonly used to provide such protection. Nevertheless, alloy AA7072 is soft and can be damaged by erosion in service. Due to its low strength, AA7072 also lowers the overall strength of the tube in pre- or post-braze conditions.

U.S. Pat. No. 7,387,844 issued to Ueda et al. on Jun. 17, 2008 discloses a brazing sheet having a structure of the kind indicated above. The water-side cladding contains 2 to 9 wt % Zn and various other alloying elements.

PCT patent publication WO 2007/042206 to Vieregge et al. published on Apr. 19, 2007 likewise discloses a multi-layer brazing sheet intended to provide long life corrosion resistance. The water-side cladding includes a braze cladding of an AA4000 series alloy and, between the core and the inner braze cladding, there is an interliner of an AA3000 series alloy or an AA1000 series alloy. For example, the interliner may be an AA3000 alloy containing less than 0.25 wt % Cu, 0.5-1.5 wt % Mn, less than 0.3 wt % Mg, and 0.1-5.0 wt % Zn.

While this alloy layer is described as an "interliner" beneath the internal brazing alloy, it should be noted that the internal brazing alloy disappears during the brazing step, in this case forming a filler metal to form interior tube compartments. In use, therefore, the interliner itself forms a coating that is directly exposed to the cooling water.

European patent publication EP 1 939 312 A1 to Minami et al., published on Jul. 2, 2008 discloses a clad member comprising a core, an outer skin on one surface of the core and an inner skin provided on the other surface of the core layer via an intermediate layer. The inner skin layer is an Al—Si brazing material that disappears after a brazing step. The interlayer then becomes the layer exposed to cooling water to provide corrosion protection. In this regard, the subject matter of Minami et al. is similar to that of Vieregge et al. described above.

While clad structures of this kind are useful in reducing internal corrosion of tubes used in heat exchangers, corrosion and erosion still takes place and it would therefore be advantageous to provide metal structures that have enhanced resistance to such corrosion and erosion.

BRIEF SUMMARY OF THE INVENTION

According to one exemplary embodiment of the invention, there is provided a multi-layer metal sheet comprising a core layer of aluminum alloy having first and second sides, wherein said first side has an interlayer made of a Zn-containing aluminum alloy positioned between a Zn-containing outer layer (sometimes referred to as a "liner") and the core layer, the alloy of the outer layer being more electronegative than the alloy of the interlayer.

Preferably, the core layer is made of an aluminum alloy comprising about 0.5 to 2.0 wt % Mn, about 0.1 to 1.0 wt % Cu, up to 0.4 wt % Fe, up to 0.25 wt % Si, and up to 0.8 wt % Mg, with the balance aluminum and unavoidable impurities (if any). The interlayer is preferably made of an alloy comprising about 0.9 to 2.0 wt % Mn, about 0.002 to 0.7 wt % Cu, up to 0.4 wt % Fe, 0.5 to 2.0 wt % Si, up to 7.0 wt % Zn, and the balance aluminum and unavoidable impurities (if any). Preferably, the water side outer layer or cladding is made of an alloy comprising about 0.9 to 2.0 wt % Mn, about 0.002 to 0.7 wt % Cu, up to 0.4 wt % Fe, 0.5 to 2.0 wt % Si, up to 7.0 wt % Zn, and the balance aluminum and unavoidable impurities (if any). Preferably the alloy of the outer layer is an essentially Al—Zn alloy with a minimum of 3 wt % Zn.

The sheet may be made in any thickness suitable for manufacture into heat-exchanger tubing or heat exchanger headers, etc. The preferred minimum thickness for tubing is about 150 μm, and the thickness range is preferably 150-1000 μm. Headerstock can be up to 3 mm thick. The outer cladding layer typically occupies 2 to 20% of the total thickness of the sheet article.

Another exemplary embodiment relates to a tube fabricated from a multilayer sheet of the above kind where the outer layer at the first side of the core forms an internal surface of the tube.

In this description, the "first side" of the core layer is the side intended for contact with cooling water or the like (the so-called "water side") and the second side of the core layer is the side that is intended for exposure to air or other gas (the so-called "air-side").

The clad sheet of the exemplary embodiments provides good resistance to corrosion and erosion.

In particularly preferred embodiments, the alloy of the interlayer is preferably an AA7000 series alloy with additions of zinc, and the alloy of the outer layer may also be an AA7000 series alloy containing 3 to 7 wt % zinc.

For an understanding of the number designation system most commonly used in naming and identifying aluminum and its alloys see "International Alloy Designations and Chemical Composition Limits for Wrought Aluminum and Wrought Aluminum Alloys", published by The Aluminum Association, revised January 2001 (the disclosure of which is incorporated herein by reference).

In the normal use of the terms within the industry, the clad (or cladding) layer is usually the term given to that layer which dictates surface characteristics such as corrosion resistance or brazeablilty. The core layer is usually the term given to the layer whose primary purpose is to influence the bulk mechanical properties of the overall sheet product. The clad layer is usually, but may not always be, thinner than the core layer. A composite or multi-layer sheet material may consist only of a core layer and a cladding layer, but sheet materials having three or more layers are of interest in the exemplary embodiments. Clearly, in a three or more layer structure, the core layer is generally an internal layer. The term "interlayer" refers to a layer provided between two adjacent layers, e.g. between a core layer and a cladding layer, and is thus internal to the sheet structure. The term "liner" generally refers to a cladding layer lining the inside of a tube or other coolant-conveying element.

The term "strength" as used herein in connection with an alloy means "yield strength (sometimes referred to as "yield stress"). This can be measured using a standard tensile test after the test specimen has been subjected to a simulated brazing cycle.

BRIEF DESCRIPTION OF THE SEVERAL VIEWS OF THE DRAWINGS

FIGS. 3A and 3B represent the structures of packages used in the Example, wherein FIG. 3A shows a two layer structure and FIG. 3B shows a three layer structure, before rolling to 300 μm final gauge.

DETAILED DESCRIPTION OF THE EXEMPLARY EMBODIMENTS

In exemplary embodiments of the present invention, a layer of aluminum alloy (referred to as an interlayer) is provided between a core layer of aluminum alloy and a corrosion-resistant but sacrificial aluminum cladding or liner containing zinc. The interlayer is an aluminum alloy having a formulation such that it blocks or delays pit-penetration into the core as corrosion proceeds.

The inventors have found that corrosion usually does not proceed evenly over an entire internal surface of a water-conveying tube or other vessel (e.g. a radiator header), but rather proceeds more quickly at specific localized sites on an exposed surface. The corrosion at these localized sites forms pits that quickly extend into the core metal and may penetrate the tubing wall to cause leaks or weak spots. The combination of the outer layer (liner) and interlayer of the exemplary embodiments blocks or delays the progression of such pits from the corrosion-resistant outer layer to the core layer and thereby improves the overall corrosion and erosion resistance of the structure.

Figure 1:
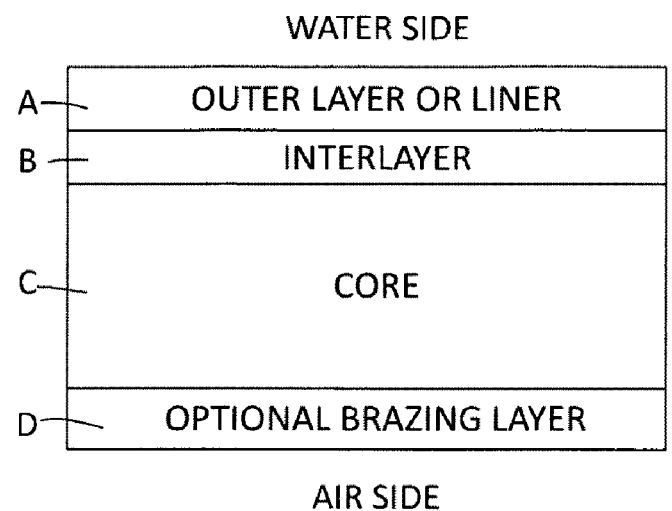
FIG. 1 is a cross-section of a composite metal sheet used to illustrate one exemplary embodiment of the present invention.
Figure 2:
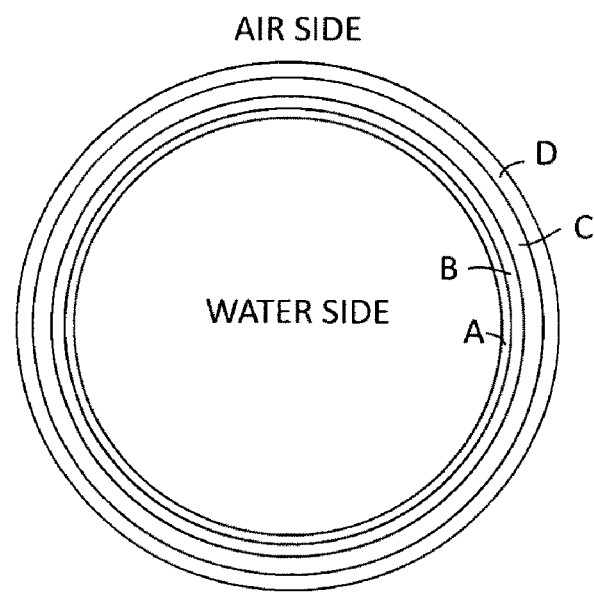
FIG. 2 shows a cross-section of a tube formed from a sheet of the kind shown in FIG. 1.

Simple multilayer structures illustrating an exemplary embodiment of the invention are shown in FIGS. 1 and 2 of the accompanying drawings. FIG. 1 is a cross-section of part of a clad metal sheet and FIG. 2 shows a tube made in conventional ways from the sheet of FIG. 1. In these drawings, layer A is a cladding layer of corrosion-resistant metal, layer B is an interlayer, layer C is a core metal layer, and layer D is a layer of a brazing alloy.

In exemplary embodiments, the alloys chosen for layers B and A provide enhanced resistance to corrosion. Particularly preferred alloys for these and the other layers are discussed below.

Layer B (Water-Side Interlayer)

The alloy for this layer preferably contains zinc and is preferably a high Si 3XXX series alloy, which produces a high density of dispersoids before and after brazing has been carried out. Examples of such alloys (designated Alloys X and Y) have compositions (in wt %) as shown in Table 1 below:

TABLE 1

| Element | Alloy X Amount | Alloy Y Amount |
|---|---|---|
| Cu | ≦0.010 | ≦0.010 |
| Fe | 0.15-0.25 | 0.15-0.25 |
| Mg | ≦0.05 | ≦0.05 |
| Mn | 1.5-2.0 | 0.97-1.03 |
| Si | 0.90-1.00 | 0.90-1.00 |
| Ti | 0.005-0.020 | 0.005-0.020 |
| V | ≦0.010 | ≦0.010 |
| Zn | 1.0-5.0 | 1.0-5.0 |
| Zr | ≦0.010 | ≦0.010 |
| Cr | ≦0.30 | ≦0.30 |
| Al | Balance | Balance |

The high levels of Mn and Si in these alloys makes them quite strong (i.e. they have a high post-braze yield strength) as they impart solid solution and particle strengthening. The alloy is generally much stronger than that of the water-side cladding (layer A) (e.g. 68 MPa vs. 35 MPa, respectively). This is particularly advantageous if "down-gauging" is required to save weight as the overall strength of the multi-layer sheet article (the so-called "package") is increased by the presence of a layer of high strength. Additionally, due to the higher post-brazed strength, the interlayer is more resistant to erosion than the water-side cladding layer (which is of considerable benefit if the latter is eroded away in parts). The Zn is added to attain the required corrosion potential, i.e. in order to make this layer sacrificial to the core layer.

Layer A (Water Side Cladding or "Liner")

The water side outer cladding layer may be any wrought aluminum alloy containing 3-7 wt % Zn (e.g. AA7000 series alloys) based on a commercial purity aluminum base. Preferably, this alloy does not contain additional Mn.

It has been observed that, when such a combination of alloy layers (layers B and A) is employed on the water side, the dominant corrosion mechanism changes from one of pitting towards the core, and eventually into the core itself, to one of movement of corrosion in a direction parallel to the core. The result is that substantially all of the sacrificial metal of the outer layers (layers B and A) must be used up before corrosion penetrates into the core.

It is believed that the open circuit corrosion potential of the outer cladding (layer A) containing 3 to 7 wt % Zn is more electronegative than the interlayer (layer B), which means that, when the layers are galvanically coupled, the outer cladding (layer A) will be sacrificial to (and hence corrode in preference to) the interlayer (layer B). This interlayer, in turn, is more electronegative than the core, which again means that the interlayer will corrode sacrificially in preference to the core alloy. Preferably, the difference in electronegativity between the respective layers is at least 50 mV. While some pitting/corrosion has been observed in tests, the pits only penetrated as far as the interface between the outer layer (layer A) and the interlayer (layer B).

If desired, the water side cladding and the interlayer may be produced from the same base alloy but with different additions of Zn. For example, the base alloy with additions of zinc up to 7 wt % (preferably up to 5 wt %) for the water side cladding, and additions of zinc up to 5 wt % (preferably up to 3 wt %) for the interlayer. Alternatively, the zinc contents may be the same, but the base compositions used to form the layers may be different to ensure that the interlayer alloy is more electropositive than the alloy forming the water side cladding.

Layer C (The Core Layer)

The metal chosen for the core layer is not critical in the exemplary embodiments and it may be any metal typically used for tubing of this kind. However, it should preferably be less electronegative (more electropositive, i.e. more "noble") than the interlayer. It is advisable, therefore, to conduct electrochemical tests on candidate alloys before using them in the core layer. Such testing can be achieved using Standard Electrode Potential measurements in accordance with ASTM G69 (the disclosure of which is incorporated herein by reference).

However, it is preferable to use alloys designated by the proprietary notification "X90x series", particularly alloy X902. These are the so-called "AA3000 series long-life alloys" since their primary alloying element is manganese (Mn). The compositions of these preferred alloys (in wt %) are shown in Table 2 below. These alloys have good air-side resistance to corrosion (e.g. after the brazing layer, layer D, has flowed to joints) and good mechanical properties. They are formulated to produce a sacrificial band of dense precipitates at the interface between the core alloy and a high Si brazing alloy. This band encourages air side corrosion laterally and so prevents perforation of the tubes from the outside.

TABLE 2

| Element | X90x Series | X902 |
| --- | --- | --- |
| Cu | 0.5-1.0 | 0.5-0.65 |
| Fe | ≦0.4 | 0.14-0.24 |
| Mg | ≦0.8 | ≦0.01 |
| Mn | 0.7-1.9 | 1.45-1.54 |
| Si | ≦0.25 | 0.03-0.09 |
| Ti | ≦0.1 | 0.005-0.030 |
| Zn | <0.1 | ≦0.04 |
| Cr | ≦0.03 | ≦0.01 |
| Al | Balance | Balance |

Layer D (Air Side Cladding)

Layer D is a brazing layer used (as explained above) for attaching cooling fins by brazing during the manufacture of a heat exchanger. Any suitable brazing alloy of low melting point may be employed, and is usually an alloy containing a large amount of Si, e.g. an alloy of the AA4000 series.

Furthermore, another layer of material of the kind used for Layer D may optionally be provided in an additional layer (not shown) on the water side overlying Layer A. Such a layer provides an additional brazing layer, e.g. for the purpose shown in PCT patent publication WO 2007/042206 to Vieregge et al. (the disclosure of which is incorporated herein by reference).

The thicknesses of the various layers is not critically important, although clearly the thicker the layers B and A are, the longer they will provide corrosion protection. For tubestock, the thickness of core layer C is usually about 150-1000 microns. The interlayer B may be around 10% of the thickness of the core metal, e.g. 15-100 microns and the outer layer A may again typically be about 10% of the metal thickness, i.e. about 15-100 microns.

The clad metal sheet may be made by any conventional procedure, e.g. hot metal coating or the like, or it may be made by hot and cold rolling a composite cast ingot, e.g. an ingot made according to the procedure of US patent publication no. 2005/0011630, published on Jan. 20, 2005, in the name of Anderson et al. (the disclosure of which is incorporated herein by reference). This procedure may be used to form a three-layer ingot (Layers D, C and B), and then the fourth layer (Layer A) may be added by conventional bonding (e.g. roll bonding) onto Layer B during subsequent hot rolling.

The clad sheet, once formed, may be converted to tube form by any known method of tube formation, e.g. by folding or welding. The clad sheet may also be used to form a header in the conventional way.

The exemplary embodiments of this invention are illustrated in more detail by the following Example, which is not to be taken as limiting the scope of the invention.

EXAMPLE

Various clad metal sheets were prepared on a laboratory scale and processed to final gauge, partially annealed and exposed to a simulated brazing cycle. The samples were then exposed to a waterside corrosion test to assess their resistance to corrosion.

Preparation of Samples

Alloys for the cladding and interlayers were cast as small bookmold ingots of size 38 mm×150 mm×200 mm. One mm was scalped off each rolling face.

Alloy X902, used for the core layer in all cases, was cast as a DC ingot of 95 mm×229 mm×1.25 m. Amounts 75 mm long were cut off each end of the ingot to remove non-steady state cast metal. The ingots were then scalped to remove 4 mm per rolling face to remove the as cast shell zone.

Six ingots of X902 alloy (for the core) having a thickness of 87 mm were reheated over 13 hours from room temperature to 540° C., heat soaked at 540° C. for 3 hours and then hot rolled to about 25 mm thick at 6 mm reduction per pass. The last setting on the mill was 24.3 mm to produce a material 25 mm thick.

Book molds for the cladding and interlayer alloys were provided in the same furnace (having a heat soak of 3 to 4.5 hours) and were hot rolled down to about 4.6 mm following the rolling of the X902 alloy. Material required for each package was cold rolled to a gauge required to achieve the target cladding or interlayer thickness, cleaned in 60° C. caustic soda, rinsed in tap water, desmutted in 50% nitric acid, rinsed and force air dried. Packages were assembled and welded on one edge prior to hot rolling, and were then reheated in a furnace already at 450° C. within 0.75 to 1 hour and hot rolled to about 5 mm. Sections of hot band (i.e. a gauge at which hot metal processing stops and further processing/rolling is done cold) were cold rolled to 300 µm thick and exposed to a partial annealing treatment used for tube stock. This involved heating up to between 250 and 300° C., over a duration of 13 hours, soaking for 6 hours and cooling to room temperature.

Figure 3B:
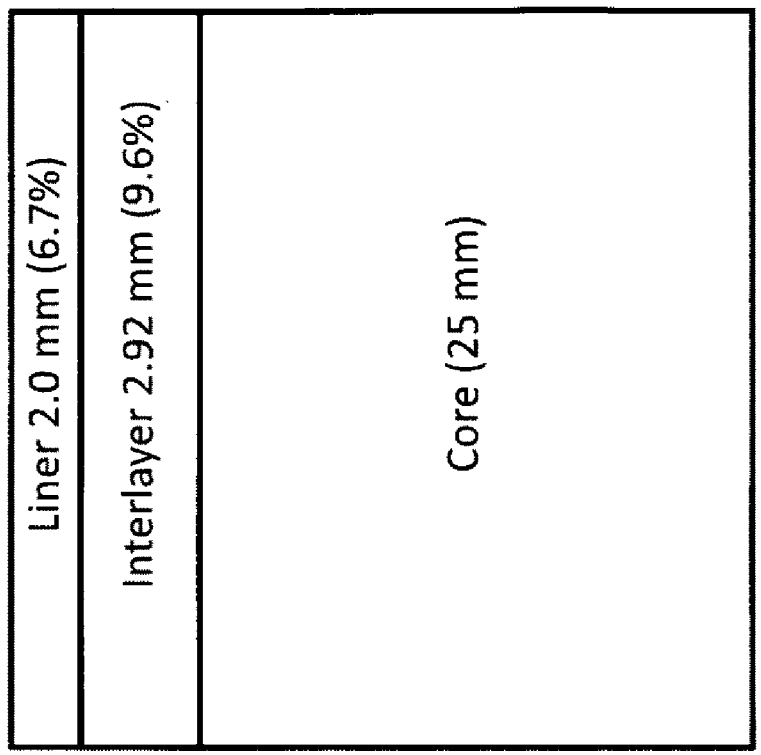
Figure 3A:
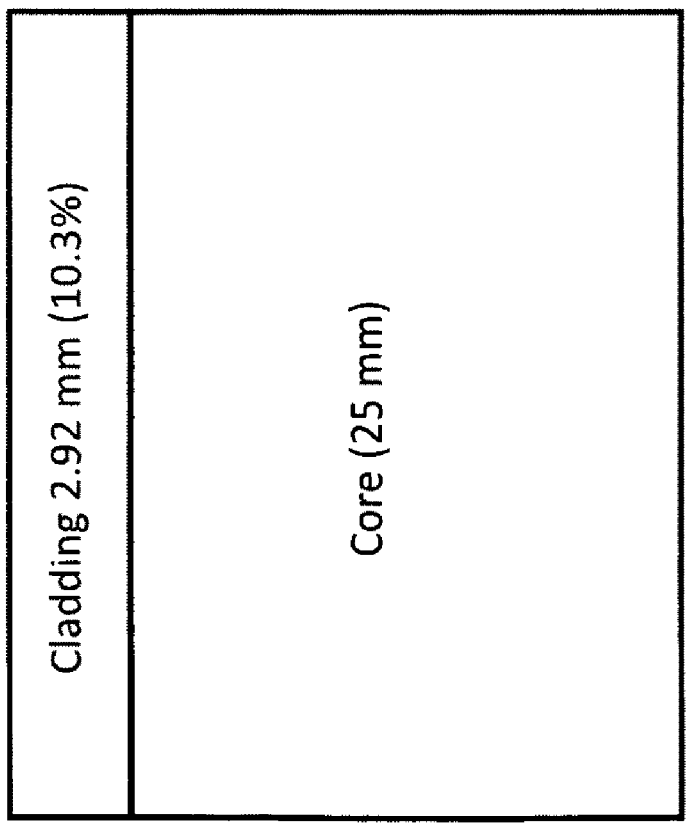

The compositions of the alloys used are as shown in Table 3 below and the samples prepared (so-called packages) are shown in Table 4. These packages are as illustrated in FIGS. 3A and 3B of the accompanying drawings. It will be noted from Table 4 that Samples A to I include interlayer variants, whereas samples J to O do not. Samples J to O were tested for comparison purposes, to show the true benefit of a S-layer system, i.e. a system that is corrosion and erosion resistant.

TABLE 3

(Results reported on a % wt/wt basis)

| Alloy | Cr | Cu | Fe | Mg | Mn | Ni | Si | Ti | V | Zn | Zr |
|---|---|---|---|---|---|---|---|---|---|---|---|
| DC X902 | 0.00036 | 0.53 | 0.18 | 0.0004 | 1.53 | 0.001 | 0.06 | 0.011 | 0.006 | 0.00 | 0.002 |
| 1 | 0.00040 | 0.002 | 0.18 | 0.0005 | 1.94 | 0.001 | 0.90 | 0.004 | 0.007 | 0.001 | 0.002 |
| 2 | 0.00060 | 0.002 | 0.19 | 0.0009 | 1.90 | 0.002 | 0.94 | 0.004 | 0.007 | 2.02 | 0.002 |
| 3 | 0.00056 | 0.002 | 0.20 | 0.0024 | 1.87 | 0.002 | 0.95 | 0.004 | 0.008 | 3.53 | 0.002 |
| 4 | 0.00057 | 0.007 | 0.20 | 0.0012 | 1.90 | 0.002 | 0.93 | 0.004 | 0.008 | 4.95 | 0.002 |
| 5 | 0.00070 | 0.64 | 0.20 | 0.0035 | 1.86 | 0.003 | 0.94 | 0.004 | 0.008 | 4.05 | 0.002 |
| 6 | 0.00072 | 0.001 | 0.17 | 0.0019 | 1.03 | 0.002 | 1.00 | 0.005 | 0.007 | 0.001 | 0.001 |
| 7 | 0.00059 | 0.001 | 0.17 | 0.0004 | 0.99 | 0.003 | 0.95 | 0.016 | 0.007 | 0.98 | 0.001 |
| 8 | 0.00053 | 0.001 | 0.18 | 0.0004 | 0.98 | 0.003 | 0.98 | 0.015 | 0.007 | 3.00 | 0.001 |
| 9 | 0.00056 | 0.002 | 0.18 | 0.0004 | 0.97 | 0.003 | 1.02 | 0.013 | 0.007 | 5.06 | 0.001 |
| 10 | <0.001 | 0.001 | 0.34 | <0.001 | 0.002 | 0.002 | 0.36 | 0.023 | 0.006 | 3.17 | 0.001 |
| 11 | <0.001 | 0.001 | 0.34 | <0.001 | 0.002 | 0.002 | 0.34 | 0.150 | 0.007 | 3.31 | 0.002 |
| 12 | <0.001 | 0.001 | 0.34 | <0.001 | 0.002 | 0.002 | 0.34 | 0.002 | 0.006 | 5.47 | 0.001 |

TABLE 4

| Package | Cladding 2 mm | Interlayer alloy 2.92 mm | Core 25 mm | Package | Cladding 2.92 mm | Core 25 mm |
|---|---|---|---|---|---|---|
| A | 10 | 5 | X902 | J | 2 | X902 |
| B | 10 | 2 | X902 | K | 3 | |
| C | 10 | 3 | | L | 4 | |
| D | 10 | 4 | | M | 7 | X902 |
| E | 12 | 2 | X902 | N | 8 | |
| F | 12 | 3 | | O | 9 | |
| G | 12 | 4 | | | | |
| H | 10 | 8 | X902 | | | |
| I | 10 | 9 | | | | |

The three-layer samples included a core 25 mm thick, and interlayer 2.92 mm thick and a cladding 2.0 mm thick. The two-layer samples included a core 25 mm thick and a cladding 2.92 mm thick. All sample variants were processed to 300 μm, partially annealed as described previously then exposed to a brazing cycle simulation.

Corrosion Test

The samples were subjected to the so-called "Standard OY Corrosion Test" which is a simulated service corrosion test (SSCT) based on the ASTM D-2570 (the disclosure of which test and standard are incorporated herein by reference). The test method evaluates the effect of circulating a test solution (usually Oyama or OY water—a standard test solution used to determine the water side corrosion resistance of heat exchanger materials—see Table 5 below) or coolant on metal test specimens under controlled, essentially isothermal conditions.

TABLE 5

(OYAMA WATER)

| Additive | Amount | Ions Generated |
|---|---|---|
| Sodium Sulphate $Na_2SO_4$ | 89 ml/g | $SO_4^{2-}$ (60.2 ppm) |
| Sodium Chloride NaCl | 226 ml/g | $Cl^-$ (136.8 ppm) |
| Cupric Chloride $CuCl_2 \cdot 2H_2O$ | 3 ml/g | $Cu^{2+}$ (1 ppm) $Cl^-$ (1.1 ppm) |

TABLE 5-continued (OYAMA WATER)

| Additive | Amount | Ions Generated |
|---|---|---|
| Ferric Chloride $FeCl_3 \cdot 6H_2O$ | 145 ml/g | $Fe^{3+}$ (300 ppm) $Cl^-$ (57 ppm) |

An alternative test solution, preferred by some investigators during waterside corrosion testing is ASTM water. This solution contains 100 ppm each of $Cl^-$, $SO_4^{2-}$ and $HCO_3^-$ ions added as their sodium salts. This solution is more benign than OY water and although not included in a specific example, all interlayer packages performed well in this environment. OY water is understood to be a much harsher, aggressive environment and consequently, better at discriminating good and poor waterside corrosion resistant packages.

In the standard test method, OY water is continuously circulated for 240 h at 85° C. at a rate of 140 liters/minute (equivalent to a lamellar constant velocity of 1.8 m/s over each specimen) in a flow loop consisting of a stainless steel reservoir, stainless steel pump, connecting hoses and a Teflon® cell, which is capable of holding and exposing 6 samples of dimensions 75×25 mm to the solution.

At the end of the test period, the samples were taken from the apparatus and any corrosion product was removed by nitric acid. Each sample was then assessed, both metallographically and by white light interferometry (WYKO), to qualify and quantify the extent of the corrosion damage. Results from the WYKO topographical analysis are tabulated and figures are quoted for maximum pit depth and pit density for each sample. Optical microscopy provides images of the extent and the topography of the corrosion attack, i.e. to determine whether the attack was pitting or whether intergrannular corrosion took place.

Six simulated service corrosion runs were carried out and notes regarding these runs are shown in Table 6 below.

TABLE 6

| Test Number | Environment | Packages tested | Flow rate*, l/min (m/s) | Test Duration (hours) |
|---|---|---|---|---|
| Run 1030 | 100% OY | A, B, C, D, E, F | 140 (1.8 m/s) | 232 |
| Run 1031 | 100% OY | G, H, I, J, K, L | 140 (1.8 m/s) | 228 |
| Run 1032 | 100% OY | M, N, O | 140 (1.8 m/s) | 120 |
| Run 1033 | 100% OY | Repeat of run #1032 | 140 (1.8 m/s) | 228 |
| Run 1038 | 100% OY | C, D, K, L, N, O | 175 (2.24 m/s) | 240 |
| Run 1040 | 100% OY | C, D, K, L, N, O | 85 (1.09 m/s) | 480 |

*The standard flow rate of 140 l/min, gives a lamellar equivalent velocity of the solution over the surface of each specimen of 1.8 m/s (or 5.9 ft/s).

The WYKO analysis of corrosion damage of interlayer variants are shown in Table 7 below. The waterside interlayer thickness in the three-layer package was 20 μm and in the two layer package was 31 μm.

TABLE 7

| | 100% OY 1.80 m/s (R1030, R1031 & R1033) | | 100% OY 2.24 m/s (R1038) | | 100% OY 1.09 m/s 20 day test (R1040) | |
|---|---|---|---|---|---|---|
| Package | Max. pit depth* (μm) | Pit density (No./cm²) | Max. pit depth* (μm) | Pit density (No./cm²) | Max. pit depth* (μm) | Pit density (No./cm²) |
| C | 20.4 | 246 | 20.7 | N/M | 17.9 | N/M |
| D | 20.3 | 285 | 18.6 | N/M | 16.2 | N/M |
| K | 123.1 | 79 | 230.5 | 43 | 94.5 | 229 |
| L | 63.7 | 154 | 103 | 73 | 19.8 | N/M |
| N | 212.1 | 110 | 201.8 | 75 | 183 | 7 |
| O | 35.5 | N/M | 43.2 | N/M | 22.1 | N/M |

*Mean of 10 deepest pits
N/M—not measured

Summary of Test Results

Figure 4:
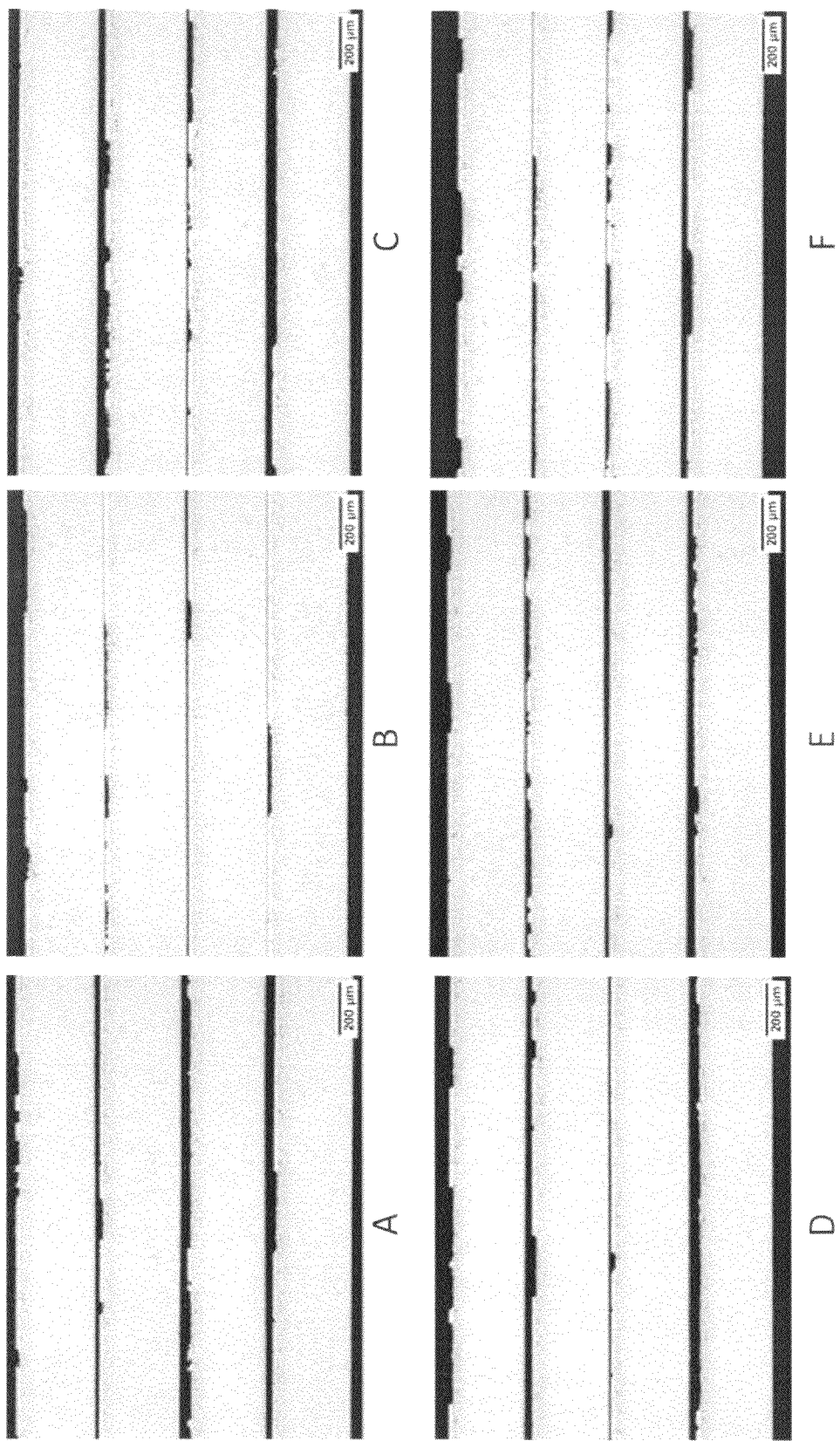
FIG. 4 is a collection of photomicrographs A through F showing the results obtained in the Example below.

Photomicrographs of the test samples are shown in FIG. 4 of the accompanying drawings. The figure relates to Test R1030, which exposed the samples for 232 hours in 100% OY water, at the standard flow rate.

The tests show that the samples having an interlayer beneath a cladding containing either 3 wt % or 5 wt % Zn are completely sacrificial to the underlying core materials when exposed to OY water in the SSCT tests.

What we claim is:

1. A multi-layer metal sheet comprising a core layer of aluminum alloy having first and second sides, wherein said first side of said core layer has an interlayer made of a Zn-containing aluminum alloy positioned between a Zn-containing outer layer and the core layer, the alloy of the outer layer being more electronegative than the alloy of the interlayer, and the alloy of the core being less electronegative than the interlayer, and wherein said interlayer is made of an alloy which comprises about 0.9 to 2.0 wt % Mn, about 0.002 to 0.7 wt % Cu, up to 0.4 wt % Fe, 0.5 to 2.0 wt % Si, up to 7.0 wt % Zn, and the balance aluminum and unavoidable impurities, if any; and said outer layer is made of an Al—Zn alloy which contains a minimum of 3 wt % Zn.

2. The sheet of claim 1, wherein the alloy of the outer layer is more electronegative than the alloy of the interlayer by at least 50 mV.

3. The sheet of claim 1, wherein said core layer is made of an alloy which comprises about 0.5 to 2.0 wt % Mn, about 0.1 to 1.0 wt % Cu, up to 0.4 wt % Fe, up to 0.25 wt % Si, and up to 0.8 wt % Mg, with the balance aluminum and unavoidable impurities, if any.

4. The sheet of claim 1, wherein the alloy of the outer layer contains 3 to 7 wt % Zn.

5. The sheet of claim 1, having a coating made of a brazing alloy on said second side.

6. The sheet of claim 5, wherein said coating on said second side comprises an aluminum alloy of the AA4000 series.

7. The sheet of claim 1, wherein said alloy of said interlayer comprises aluminum and the following elements in the amounts shown in wt %:

| Element | Amounts |
|---|---|
| Cu | ≦0.010 |
| Fe | 0.15-0.25 |
| Mg | ≦0.05 |
| Mn | 1.5-2.0 |
| Si | 0.90-1.00 |
| Ti | 0.005-0.020 |
| V | ≦0.010 |
| Zn | 1.0-5.0 |
| Zr | ≦0.010 |
| Cr | ≦0.30. |

8. The sheet of claim 1, wherein said alloy of said interlayer comprises aluminum and the following elements in the amounts shown in wt %:

| Element | Amounts |
|---|---|
| Cu | ≦0.010 |
| Fe | 0.15-0.25 |
| Mg | ≦0.05 |
| Mn | 0.97-1.03 |
| Si | 0.90-1.00 |
| Ti | 0.005-0.020 |
| V | ≦0.010 |
| Zn | 1.0-5.0 |
| Zr | ≦0.010 |
| Cr | ≦0.30. |

9. The sheet of claim 1, wherein said core layer is made of an alloy comprising aluminum and the following elements in amounts shown in wt %:

| Element | Amounts |
|---|---|
| Cu | 0.5-1.0 |
| Fe | ≦0.4 |
| Mg | ≦0.8 |
| Mn | 0.7-1.9 |
| Si | ≦0.25 |
| Ti | ≦0.1 |
| Zn | ≦0.1 |
| Cr | ≦0.03. |

10. The sheet of claim 1, wherein said core layer is made of an alloy comprising aluminum and the following elements in amounts shown in wt %:

| Element | Amounts |
|---|---|
| Cu | 0.5-0.65 |
| Fe | 0.14-0.24 |
| Mg | ≦0.01 |
| Mn | 1.45-1.54 |

-continued

| Element | Amounts |
|---------|---------|
| Si | 0.03-0.09 |
| Ti | 0.005-0.030 |
| Zn | ≦0.04 |
| Cr | ≦0.01. |

11. The sheet of claim 1, wherein the alloy of the interlayer is more electronegative than the alloy of the core by at least 50 mV.

12. A tube made of the clad metal sheet of claim 1, wherein said Zn-containing outer layer forms an internal surface of the tube.

13. A radiator header made of the clad metal of claim 1, wherein said Zn-containing outer layer forms an internal surface of the header.

* * * * *